(12) United States Patent
Sogabe

(10) Patent No.: US 12,314,030 B2
(45) Date of Patent: May 27, 2025

(54) CONTROL DEVICE FOR MACHINE TOOL

(71) Applicant: OKUMA CORPORATION, Niwa-Gun (JP)

(72) Inventor: Eisuke Sogabe, Niwa-Gun (JP)

(73) Assignee: Okuma, Niwa-Gun (JP)

( * ) Notice: Subject to any disclaimer, the term of this patent is extended or adjusted under 35 U.S.C. 154(b) by 370 days.

(21) Appl. No.: 17/934,615

(22) Filed: Sep. 23, 2022

(65) Prior Publication Data

US 2023/0102126 A1  Mar. 30, 2023

(30) Foreign Application Priority Data

Sep. 29, 2021  (JP) .................................. 2021-159541

(51) Int. Cl.
G05B 19/4065 (2006.01)
B23Q 15/12 (2006.01)

(52) U.S. Cl.
CPC ......... *G05B 19/4065* (2013.01); *B23Q 15/12* (2013.01); *G05B 2219/37245* (2013.01)

(58) Field of Classification Search
None
See application file for complete search history.

(56) References Cited

U.S. PATENT DOCUMENTS

2023/0078825 A1* 3/2023 Ookura ................... B23B 35/00
700/114

FOREIGN PATENT DOCUMENTS

| JP | H06-059715 A | 3/1994 | |
| JP | 2001-277075 A | 10/2001 | |
| JP | 2006-088299 A | 4/2006 | |
| WO | WO-2021141016 A1 * | 7/2021 | ............. B23B 35/00 |

OTHER PUBLICATIONS

Japanese Office Action (with English translation) dated Dec. 3, 2024 (Application No. 2021-159541).

* cited by examiner

*Primary Examiner* — Ryan A Jarrett
(74) *Attorney, Agent, or Firm* — BURR PATENT LAW, PLLC

(57) ABSTRACT

A control device for a machine tool includes a tool mounted on a main spindle relatively movable with respect to a workpiece and machines the workpiece using the tool. The control device includes: a parameter preparing unit, an evacuation unit, and an evacuation diagnosing unit. The parameter preparing unit preliminarily stores a predetermined parameter relating to a control. The evacuation unit causes the tool to perform an evacuation operation from the workpiece. The evacuation diagnosing unit diagnoses whether the evacuation operation is normal. When the evacuation diagnosing unit diagnoses that the evacuation operation is abnormal, the evacuation operation is cancelled.

8 Claims, 4 Drawing Sheets

CONTROL DEVICE FOR MACHINE TOOL

CROSS REFERENCE TO RELATED APPLICATION

This application claims the benefit of Japanese Patent Application Number 2021-159541 filed on Sep. 29, 2021, the entirety of which is incorporated by reference.

FIELD OF THE INVENTION

The disclosure relates to a control device that safely and automatically evacuates a tool without breakage when a machining failure or the like occurs in a machine tool.

BACKGROUND OF THE INVENTION

In threading using a tap as a tool in a machine tool, an operation to extract the tap becomes necessary in the middle of machining from a screw hole when an abnormality occurs during the machining. When the extraction operation is automatically performed by the machine, the tap is subject to a heavy load when a chip is jammed between a cutting edge and a created screw surface, in the worst case, breakage is caused to have a workpiece failure. Therefore, in the current situation, a human manually performs the extraction operation by adjusting the load during the extraction operation, thus taking a great deal of man-hours until the machining resumption, which leads to degrade of the productivity. Accordingly, there is proposed a method to control an evacuation speed during the evacuation based on information on the tap and information on the workpiece.

For example, JP 1994-59715 A describes a disclosure that calculates a main spindle speed of an extraction operation with pitch information of a tap and a material information of a workpiece as an input, and evacuates the tool at the calculated speed. Thus, the extraction operation is automatized without causing a damage on the tap or the workpiece.

The technique in JP 1994-59715 A described above proposes a technique that determines a main spindle speed of the extraction operation at which breakage is not caused for each material of workpiece in advance, and evacuates the tool at the speed calculated based on the main spindle speed determined with material information of the workpiece as an input and pitch information of the tap. However, depending on a jamming condition of chips between the cutting edge and the created screw surface when the machining is interrupted, simply performing the reverse operation cannot prevent the breakage since a heavy load is applied on the tap. FIG. 1 illustrates operational torques in different jamming conditions of chips during evacuation in tap machining. FIG. 1A illustrates a case where the chips are less jammed, and FIG. 1B illustrates a case where the chips are more jammed. While the evacuation is achieved without breakage when the chips are less jammed, when the chips are more jammed, a vibration is caused in the operational torque immediately before the interruption of machining, and the tool is broken after performing the reverse operation to evacuate. Accordingly, in the worst case, breakage is caused to have a workpiece failure with the conventional disclosure. Alternatively, occurrence of the extraction by a manual operation by a human degrades the productivity.

Therefore, it is an object of the disclosure to provide a control device for a machine tool that ensures automatically evacuating a tool without breakage when a machining failure or the like occurs to reduce degradation of the productivity.

SUMMARY OF THE INVENTION

In order to achieve the above-described object, there is provided a control device for a machine tool that includes a tool mounted on a main spindle relatively movable with respect to a workpiece and machines the workpiece using the tool. The control device includes: a parameter preparing unit, an evacuation unit, and an evacuation diagnosing unit. The parameter preparing unit preliminarily stores a predetermined parameter relating to a control. The evacuation unit causes the tool to perform an evacuation operation from the workpiece. The evacuation diagnosing unit diagnoses whether the evacuation operation is normal. When the evacuation diagnosing unit diagnoses that the evacuation operation is abnormal, the evacuation operation is cancelled.

Another aspect of the disclosure, which is in the above configuration, further includes a machining diagnosing unit that diagnoses whether the machining of the workpiece is normal. The evacuation unit causes the tool to perform the evacuation operation from the workpiece when the machining is diagnosed to be abnormal by the machining diagnosing unit.

In another aspect of the disclosure, which is in the above configuration, the tool is a tap. The parameter preparing unit stores a section modulus, a tensile strength, and a safety factor of the tap as the parameters. The evacuation diagnosing unit compares a breaking torque threshold value calculated based on the section modulus, the tensile strength, and the safety factor with an operational torque of the tap to diagnose whether the evacuation operation is normal.

Another aspect of the disclosure, which is in the above configuration, further includes an alarm activating unit that activates an alarm. When the evacuation diagnosing unit diagnoses that the evacuation operation is abnormal, the control device causes the alarm activating unit to activate the alarm after cancelling the evacuation operation.

Another aspect of the disclosure, which is in the above configuration, further includes a chip discharging unit that causes the tool to perform a discharge operation of chip. When the evacuation diagnosing unit diagnoses that the evacuation operation is abnormal, the control device causes the chip discharging unit to perform the discharge operation of chip after cancelling the evacuation operation.

In another aspect of the disclosure, which is in the above configuration, the tool is a tap. The parameter preparing unit stores a pitch of a chip discharge groove of the tap and a preset tap rotation number. The chip discharging unit, when the evacuation operation is diagnosed to be abnormal by the evacuation diagnosing unit, calculates a discharging operation distance of chip from the pitch of the chip discharge groove and the tap rotation number, and causes the tap to perform a feeding movement and a rotating movement by the discharging operation distance in a direction same as a processing direction.

In another aspect of the disclosure, which in the above configuration, the parameter preparing unit is capable of discharging chip, preliminarily identifies an operational distance that allows an evacuation without a damage on the tap or the workpiece, and determines the tap rotation number based on an identification result and the pitch.

Another aspect of the disclosure, which is in the above configuration, further includes an alarm activating unit that activates an alarm. When the evacuation diagnosing unit diagnoses that the evacuation operation is abnormal, the control device causes the alarm activating unit to activate the alarm after cancelling the evacuation operation.

In another aspect of the disclosure, which is in the above configuration, the parameter preparing unit stores a set number threshold value counting two operations of the evacuation operation and the discharge operation of chip as one set. The alarm activating unit counts a set number of the two operations of the evacuation operation and the discharge operation of chip, compares the counted set number with the set number threshold value, and when the set number exceeds the set number threshold value, activates the alarm.

With the disclosure, the evacuation operation of the tool is diagnosed, and the evacuation operation is cancelled when the evacuation operation is abnormal. Therefore, it ensures automatically evacuating the tool without breakage when a machining failure or the like occurs to reduce degradation of the productivity.

DETAILED DESCRIPTION OF THE INVENTION

The following describes an embodiment of the disclosure based on the drawings.

Figure 1A:
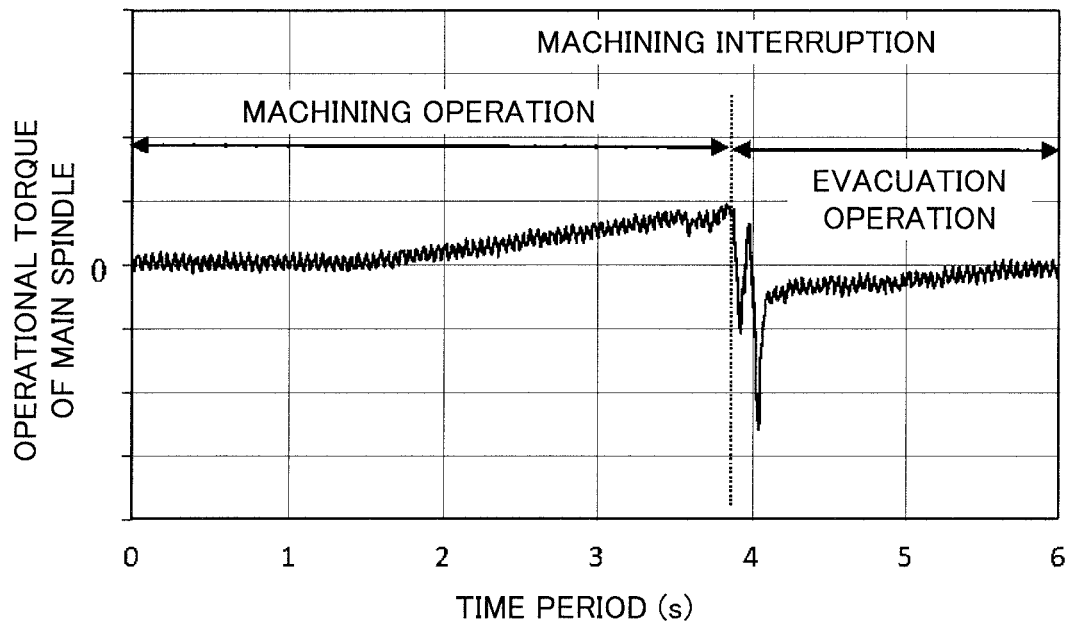
FIG. 1A is an explanatory view illustrating changes in operational torque of a main spindle when a tap is evacuated in a case where the chips are less jammed.
Figure 1B:
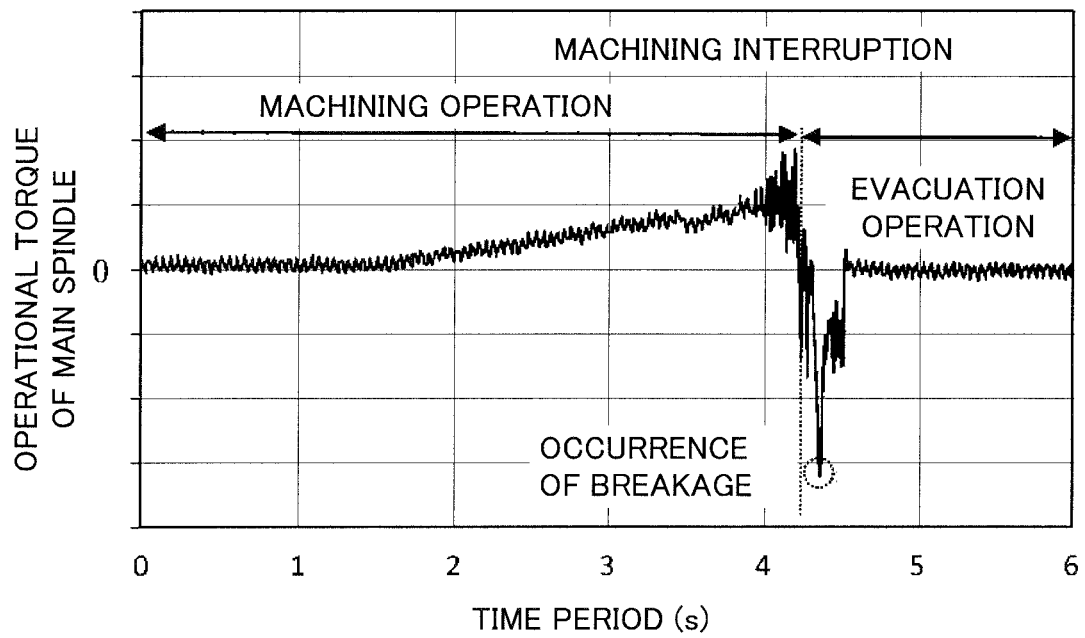
FIG. 1B is an explanatory view illustrating changes in operational torque of a main spindle when a tap is evacuated in a case where the chips are more jammed.
Figure 2:
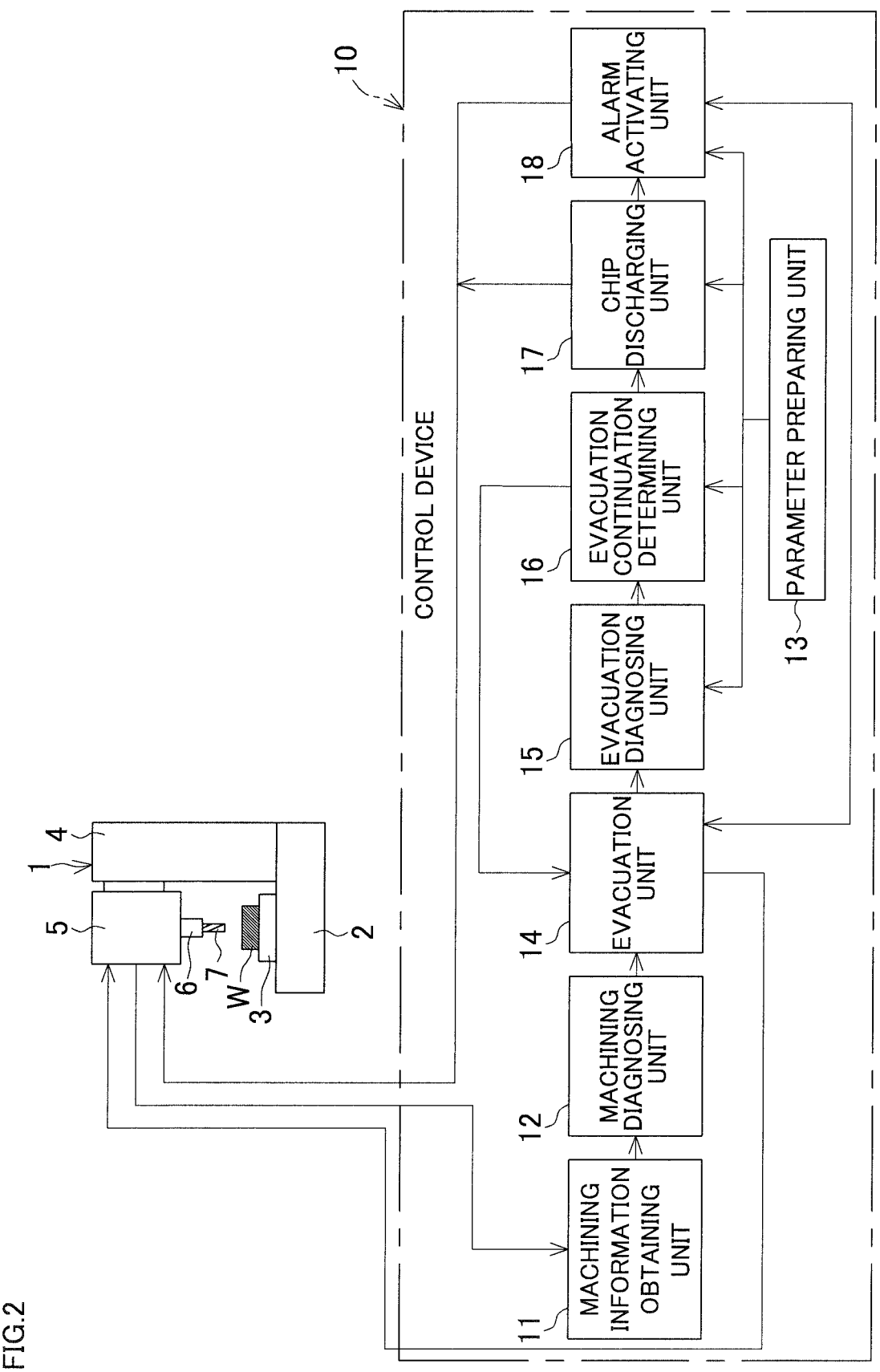
FIG. 2 is a block configuration diagram of a control device for a machine tool.

FIG. 2 is a block configuration diagram illustrating an exemplary control device of the disclosure. A control device 10 is attached to a machine tool 1. The control device 10 may be contained in a position controller (not illustrated) of the machine tool 1.

The machine tool 1 includes a table 3, a column 4, and a main spindle head 5. The table 3 is supported on a bed 2 in a movable manner in right-left direction (Y-axis direction). The column 4 is secured on the bed 2. The main spindle head 5 is supported by the column 4 in a movable manner in orthogonal direction (X-axis direction) and up-down direction (Z-axis direction). The main spindle head 5 rotatably supports a downward main spindle 6 on which a tool 7 is mountable.

The control device 10 is provided with a machining information obtaining unit 11, a machining diagnosing unit 12, a parameter preparing unit 13, an evacuation unit 14, an evacuation diagnosing unit 15, an evacuation continuation determining unit 16, a chip discharging unit 17, and an alarm activating unit 18.

The machining information obtaining unit 11 obtains control information of the machine tool 1 and measurement signals of various kinds of sensors (not illustrated) as machining information.

The machining diagnosing unit 12 diagnoses whether the machining is normal or abnormal based on machining information obtained by the machining information obtaining unit 11.

The parameter preparing unit 13 stores the values that are input or calculated parameters used for the control of the disclosure.

The evacuation unit 14 commands the machine tool 1 to perform an evacuation operation that causes the tool 7 to evacuate from a workpiece W when an abnormality is detected by the machining diagnosing unit 12.

The evacuation diagnosing unit 15 compares a breaking torque threshold value calculated based on a setting value of the parameter preparing unit 13 with the machining information to diagnose whether the evacuation operation is normal or abnormal, and outputs the diagnostic result to the evacuation continuation determining unit 16.

The evacuation continuation determining unit 16 commands the evacuation unit 14 to continue the evacuation operation when the diagnostic result of the evacuation diagnosing unit 15 is normal. The evacuation continuation determining unit 16 commands the evacuation unit 14 to cancel the evacuation operation when the diagnostic result is abnormal, and commands the chip discharging unit 17 to perform a chip discharging operation to discharge the chips.

The chip discharging unit 17 commands the machine tool 1 to perform the chip discharging operation that performs a feeding and rotating movement of the tool 7 by a discharging operation distance calculated using the setting value of the parameter preparing unit 13.

The alarm activating unit 18 counts two operations of the evacuation operation and the chip discharging operation as one set. The alarm activating unit 18 compares the number of counted sets with a set number threshold value as a setting value of the parameter preparing unit 13 to determine whether to cancel the operation and activate the alarm or to continue the evacuation operation.

Figure 3:
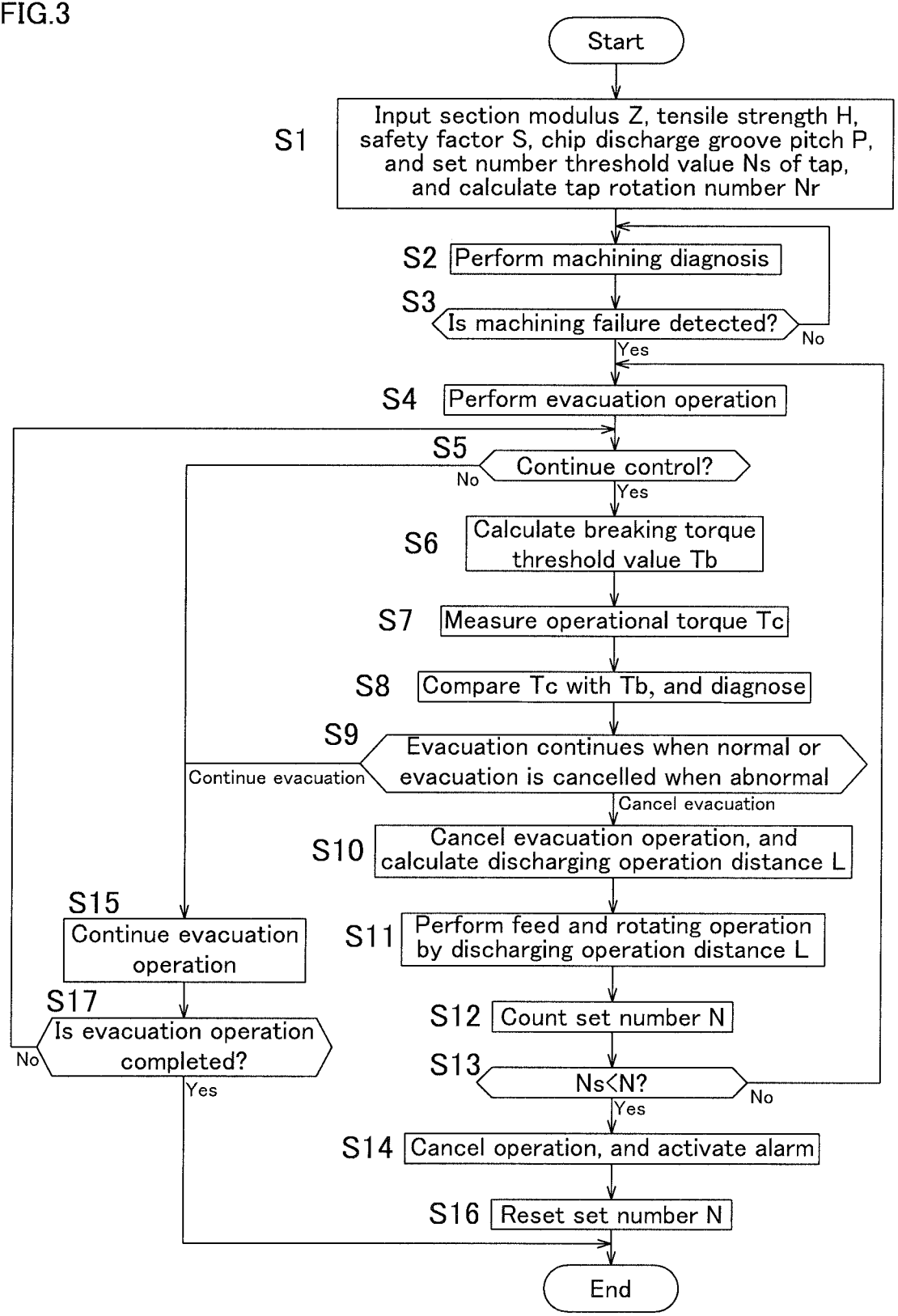
FIG. 3 is a flowchart illustrating a control by a control device.

The following describes a detail of the control by the control device 10 based on the flowchart in FIG. 3.

Step (hereinafter simply written as "S") 1 illustrated in FIG. 3 is performed by the parameter preparing unit 13, S2 to S3 are performed by the machining diagnosing unit 12, S4, S15, and S17 are performed by the evacuation unit 14, S5 to S6, and S8 are performed by the evacuation diagnosing unit 15, S7 is performed by the machining information obtaining unit 11, S9 is performed by the evacuation continuation determining unit 16, S10 to S11 are performed by the chip discharging unit 17 and the evacuation unit 14, and S12 to S14, and S16 are performed by the alarm activating unit 18.

First, at S1, a section modulus Z, a tensile strength H, a safety factor S, a pitch P of a chip discharge groove, and a set number threshold value Ns of a tap as the tool 7 are input and stored. A tap rotation number Nr is calculated by identifying an operational distance preliminarily confirmed that the chips can be discharged and the evacuation is possible without a damage on the tap or the workpiece W, and dividing the identification result by the pitch P of the chip discharge groove, and stored.

At S2, the machining diagnosis is performed. When a machining failure is not detected in the determination at S3, the machining diagnosis is continued at S2. When a machining failure is detected, the evacuation operation that causes the tool 7 to evacuate from the workpiece W is performed at S4.

At S5, it is determined whether to continue the control or not. When it is not continued, the evacuation operation is continued at S15. At S17, it is determined whether the evacuation operation is completed or not. When it is completed, the evacuation operation is terminated. When it is not completed, the procedure returns to S5. When the control is continued at S5, the procedure proceeds to S6.

At S6, a breaking torque threshold value Tb is calculated from the section modulus Z, the tensile strength H, and the safety factor S of the tap by the following formula (1).

$$Tb=2ZH/S \tag{1}$$

At S7, an operational torque Tc of the main spindle 6 during the evacuation operation is measured, and the operational torque Tc is compared with the breaking torque threshold value Tb at S8. Here, when the operational torque Tc is smaller than the breaking torque threshold value Tb, the evacuation operation is normal. When the operational torque Tc is larger than the breaking torque threshold value Tb, it is output to S9 as abnormal. At S9, when the evacuation operation is normal, it is determined to continue the evacuation operation, and the evacuation operation is continued at S15. When the evacuation operation is abnormal, it is determined to cancel the evacuation, and the evacuation operation is cancelled at S10 and a discharging operation distance L is calculated by the following formula (2).

$$L=PNr \tag{2}$$

At S11, the chip discharging operation that performs the feeding and rotating movement of the tap by the discharging operation distance L is performed. The spindle rotation speed and feed speed of the chip discharging operation are not at all limited, and in the embodiment, it has a condition similar to that of the machining operation.

At S12, the two operations of the evacuation operation and the chip discharging operation are counted as one set, and a set number N is counted. At S13, the set number N is compared with the set number threshold value Ns. For the set number threshold value Ns, the two operations of the evacuation operation and the chip discharging operation are counted as one set, the set number that does not cause a damage on an operational shaft of the machine is preliminarily confirmed, and its value is used.

When the set number N is smaller than the set number threshold value Ns in the determination at S13 (No at S13), the evacuation operation is continued at S4. When the set number N is larger than the set number threshold value Ns (Yes at S13), the operation is cancelled at S14, the alarm is activated, and at S16, the set number N is reset and the procedure is terminated.

Figure 4:
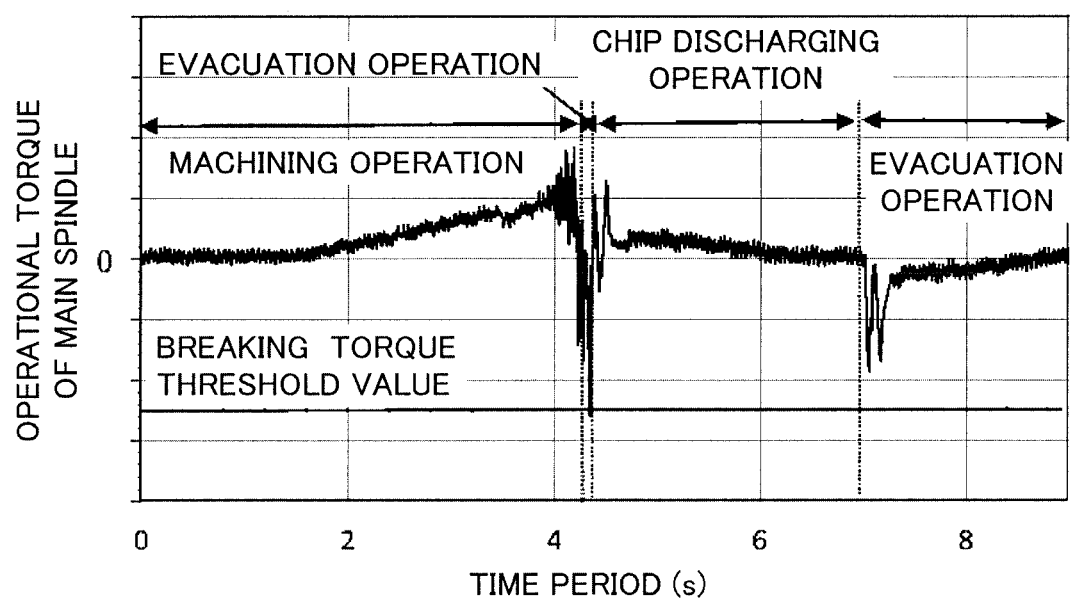
FIG. 4 is an explanatory view illustrating a change in operational torque of the main spindle when the control is applied.

FIG. 4 illustrates a change in operational torque of the main spindle 6 when the control is applied in the configuration. After the machining failure diagnosis, the operational torque during the evacuation operation is monitored with the breaking torque threshold value. When the operational torque exceeds the breaking torque threshold value, the chip discharging operation is performed, and when the operational torque does not exceed the breaking torque threshold value, the evacuation operation is performed again. Thus, it is seen that the tap has been successfully evacuated from the workpiece without breakage.

Thus, the control device 10 for the machine tool 1 in the above-described configuration includes the parameter preparing unit 13, which preliminarily stores the parameters relating to the control, the evacuation unit 14, which causes the tool 7 to perform the evacuation operation from the workpiece W, and the evacuation diagnosing unit 15, which diagnoses whether the evacuation operation is normal or not, and cancels the evacuation operation when the evacuation diagnosing unit 15 diagnoses that the evacuation operation is abnormal.

Accordingly, when a machining failure occurs, the tool 7 can be automatically evacuated without breakage, thereby ensuring reduced degradation of the productivity.

The following describes a modification example of the disclosure.

In the above-described configuration, the evacuation operation is performed when a machining failure occurs. However, the disclosure is also applicable to the case where the evacuation operation is performed for avoiding collision and the like during ordinary machining, not limited to when a machining failure occurs.

In the above-described configuration, the evacuation continuation determining unit, which determines whether the evacuation operation is continued or not, is provided together with the evacuation diagnosing unit. However, the evacuation continuation determining unit may be omitted, and the evacuation operation may be cancelled based on an abnormality diagnosis of the evacuation operation by the evacuation diagnosing unit. The evacuation diagnosing unit may include a process of determining the evacuation continuation.

In the above-described configuration, when the evacuation operation is determined to be abnormal, the evacuation operation is cancelled and the discharge operation of chip is performed. However, without performing the discharge operation of chip, the alarm may be activated. Also in the case, the breakage of the tool can be avoided by cancelling the evacuation operation.

There is no problem when the machining diagnosing unit uses the method to diagnose normal or abnormal by comparing the machining information with the preset threshold value or uses the method to diagnose normal or abnormal by using a mathematical model by learning the machining information using machine learning.

Other than the above, the machine tool is not limited to the above-described configuration. The tool is also not limited to the tap.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A control device for a machine tool that includes a tap mounted on a main spindle relatively movable with respect to a workpiece and machines the workpiece using the tap, the control device comprising:
   a parameter preparing unit that preliminarily stores a predetermined parameter relating to a control;
   an evacuation unit that causes the tap to perform an evacuation operation from the workpiece; and
   an evacuation diagnosing unit that diagnoses whether the evacuation operation is normal, wherein
   the parameter preparing unit stores a section modulus, a tensile strength, and a safety factor of the tap as the parameters,
   the evacuation diagnosing unit compares a breaking torque threshold value calculated based on the section modulus, the tensile strength, and the safety factor with an operational torque of the tap to diagnose whether the evacuation operation is normal, and when the evacuation diagnosing unit diagnoses that the evacuation operation is abnormal, the evacuation operation is cancelled.

2. The control device for the machine tool according to claim 1, further comprising
a machining diagnosing unit that diagnoses whether the machining of the workpiece is normal, wherein
the evacuation unit causes the tool to perform the evacuation operation from the workpiece when the machining is diagnosed to be abnormal by the machining diagnosing unit.

3. The control device for the machine tool according to claim 1, further comprising
an alarm activating unit that activates an alarm, wherein
when the evacuation diagnosing unit diagnoses that the evacuation operation is abnormal, the control device causes the alarm activating unit to activate the alarm after cancelling the evacuation operation.

4. A control device for a machine tool that includes a tool mounted on a main spindle relatively movable with respect to a workpiece and machines the workpiece using the tool, the control device comprising:
a parameter preparing unit that preliminarily stores a predetermined parameter relating to a control;
an evacuation unit that causes the tool to perform an evacuation operation from the workpiece;
a chip discharging unit that causes the tool to perform a discharge operation of chip, and
an evacuation diagnosing unit that diagnoses whether the evacuation operation is normal, wherein
when the evacuation diagnosing unit diagnoses that the evacuation operation is abnormal, the evacuation operation is cancelled, and
when the evacuation diagnosing unit diagnoses that the evacuation operation is abnormal, the control device causes the chip discharging unit to perform the discharge operation of chip after cancelling the evacuation operation.

5. The control device for the machine tool according to claim 4, wherein
the tool is a tap,
the parameter preparing unit stores a pitch of a chip discharge groove of the tap and a preset tap rotation number, and
the chip discharging unit, when the evacuation operation is diagnosed to be abnormal by the evacuation diagnosing unit, calculates a discharging operation distance of chip from the pitch of the chip discharge groove and the tap rotation number, and causes the tap to perform a feeding movement and a rotating movement by the discharging operation distance in a direction same as a processing direction.

6. The control device for the machine tool according to claim 5, wherein
the parameter preparing unit is capable of discharging chip, preliminarily identifies an operational distance that allows an evacuation without a damage on the tap or the workpiece, and determines the tap rotation number based on an identification result and the pitch.

7. The control device for the machine tool according to claim 4, further comprising
an alarm activating unit that activates an alarm, wherein
when the evacuation diagnosing unit diagnoses that the evacuation operation is abnormal, the control device causes the alarm activating unit to activate the alarm after cancelling the evacuation operation.

8. The control device for the machine tool according to claim 7, wherein
the parameter preparing unit stores a set number threshold value counting two operations of the evacuation operation and the discharge operation of chip as one set, and
the alarm activating unit counts a set number of the two operations of the evacuation operation and the discharge operation of chip, compares the counted set number with the set number threshold value, and when the set number exceeds the set number threshold value, activates the alarm.

* * * * *